Figure 1:
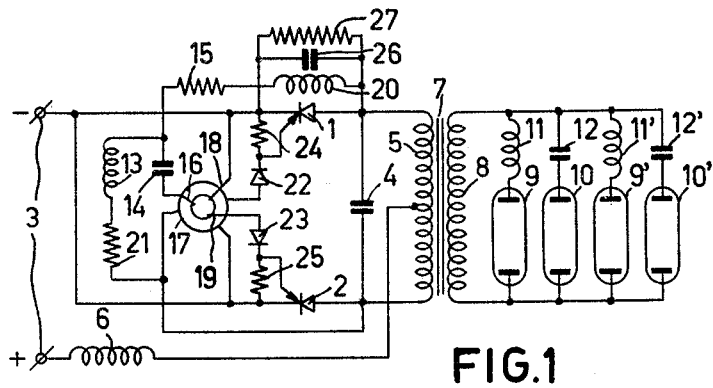

March 15, 1966     J. J. WILTING     3,241,039
SELF-GENERATING CONVERTER CONTAINING AT LEAST ONE
SEMI-CONDUCTOR CONTROLLED RECTIFIER
Filed Feb. 8, 1962

INVENTOR
JOHANNES J. WILTING
BY
AGENT

United States Patent Office 3,241,039
Patented Mar. 15, 1966

3,241,039
SELF-GENERATING CONVERTER CONTAINING AT LEAST ONE SEMICONDUCTOR CONTROLLED RECTIFIER
Johannes Jacobus Wilting, Emmasingel, Eindhoven, Netherlands, assignor to North American Philips Company, Inc., New York, N.Y., a corporation of Delaware
Filed Feb. 8, 1962, Ser. No. 171,867
Claims priority, application Netherlands, Feb. 13, 1961, 261,180
12 Claims. (Cl. 321—44)

This invention relates to a self-generating converter and in particular to one including at least one, semi-conductor controller rectifier (also called a thyristor), the main current circuit electrodes of which are connected to the terminals of a direct-current supply circuit, and a series resonant circuit through which one of the rectifier main current circuit electrodes is connected to the corresponding terminal of the supply circuit, the capacitative part of the series resonant circuit being coupled with a load circuit.

Converters of this general type are known in which gas-filled triodes or thyratrons are employed instead of semi-conductor controlled rectifiers. In these circuit arrangements, the pulse duration of the pulsatory current passing through the main current circuit of the conducting rectifier is determined by the series resonance frequency of the resonant circuit. This pulse duration is furthermore at most equal to one-half period of the generated alternating voltage. Consequently, the rectifier extinguishes at the zero passage of the current through its main current circuit and an appreciable forward voltage is applied to this main current circuit only with a certain time lag; a reignition of the rectifier cannot occur if this time lag exceeds the recovery time of the rectifier, for example the deionization time of a thyratron.

In the case of converters with semi-conductor controlled rectifiers, it has been found that the switching or operating frequency is changed to some extent by the converter load and/or by the voltage of the direct-current supply circuit and is controllable only to a limited extent; in addition the dissipation and hence the losses in the control-circuit are comparatively high. It is obvious that this is an undesirable condition.

It is an object of this invention to provide a converter circuit of the above type with at least one semi-conductor controlled rectifier in which the switching or operating frequency is constant and independent of the load and/or of the supply voltage, and to be able to control this frequency.

According to the present invention, the semi-conductor controlled rectifier is rendered periodically conducting by a pulse produced under the control of the current passing through a second resonant circuit which is subcritically damped and is connected across the capacitative part of the series resonant circuit. The second circuit includes at least one resistive element and one non-linear element; just after the zero passage of the current through or of the voltage across one of the reactive elements of this second resonant circuit, the non-linear element changes over from one polarization state to the opposite polarization state, thus producing the said pulse. Under these conditions the switching frequency of the converter is determined mainly by the values of the reactive and resistive elements of the second resonant circuit; thus it may be substantially independent of the converter load and supply voltage.

The non-linear element of the aforesaid second resonant circuit may be, for example, a capacitor with a dielectric made of a material having a voltage-dependent dielectric constant which decreases strongly above a "saturation value" of the electric field occurring therein; such a material is, for example, barium titanate. The non-linear element may also be a control-transformer having a saturable core of a ferromagnetic material, for example, a core of ferrite having a substantially rectangular hysteresis loop. If use is made of such a control-transformer, the second resonant circuit includes the low impedance primary winding of the transformer, a secondary winding of which is coupled to the circuit between the emitter and the control-electrode of the controlled rectifier.

For certain uses it may be advantageous if the switching frequency of the converter decreases with increasing voltage across the supply circuit and/or across the load circuit. With increasing loading, this frequency then increases. In such cases also, use may be made of a converter according to the present invention, in which the second resonant circuit includes a capacitor and an inductor connected in parallel with each other, whereas the series combination of the resistor of this second resonant circuit and of this parallel combination is connected across the capacitative part of the first resonant circuit, connected between one of the main current circuit electrodes of the rectifier and the corresponding terminal of the supply circuit. In this case, the resistor of the second resonant circuit is formed by a symmetrical resistor, the value of which decreases with increasing voltage, for example a so-called VDR or an NTC resistor.

Figure 2:
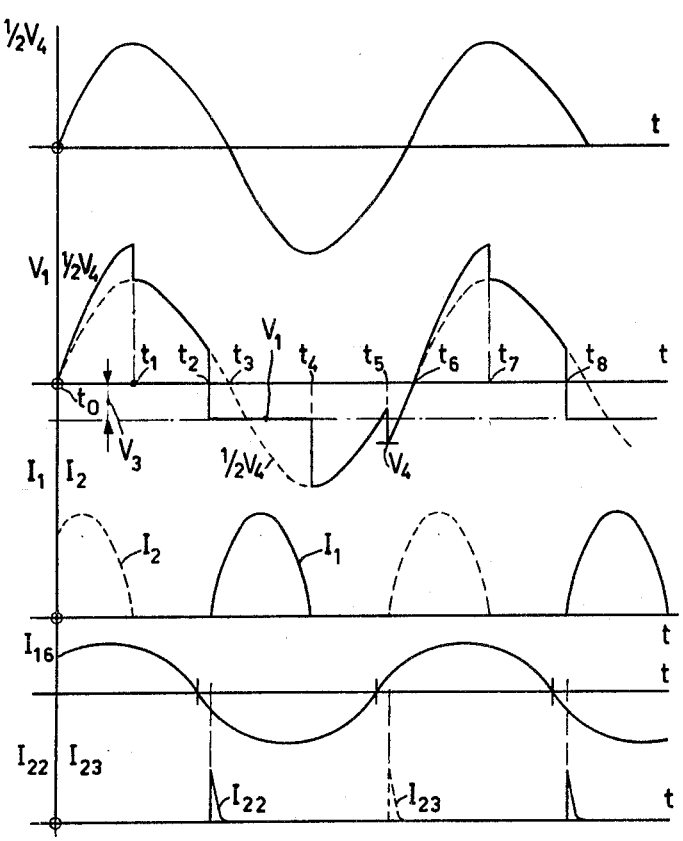

The invention will be better understood in conjunction with the description below with reference to the drawing, in which:

FIG. 1 shows the diagram of one embodiment of the self-generating converter with semi-conductor controlled rectifiers according to the invention; and FIG. 2 shows voltage- and current-time diagrams for explaining the mode of operation of this embodiment.

The embodiment shown in FIG. 1 includes two semi-conductor controlled rectifiers 1 and 2. The main current circuits of these rectifiers are connected to the two different terminals of a direct-current supply source 3. A resonant circuit having a series-resonance character consisting of the parallel combination of a capacitor 4 and the center-tapped primary winding 5 of a transformer 7 in series with an inductor 6 is connected between one of the main current circuit electrodes of each of the rectifiers 1 and 2 and the corresponding terminal of the supply circuit 3. The capacitative part of this resonant circuit consisting of the parallel combination of the elements 4 and 5 is coupled with a load circuit by means of a secondary winding 8 of the transformer 7. This load circuit may consist, for example, of the parallel combination of a plurality of fluorescent gas discharge lamps 9, 9', 10 and 10' each connected in series with a control-impedance 11, 11' and 12, 12' respectively. The control-impedances 11 and 11' are inductors, whereas the control-impedances 12 and 12' are capacitors. By this means, the load of the self-generating converter comprising the rectifiers 1 and 2 is rendered substantially resistive; in addition the alternating currents passing through the tubes 9 and 9' have a phase shift of about 90° with respect to the currents passing through the tubes 10 and 10'. The latter condition counteracts a disturbing stroboscopic effect which may occur at low switching frequencies.

The rectifiers 1 and 2 are rendered periodically conductive by pulses produced under the control of the current passing through a sub-critically damped, second resonant circuit connected across the capacitative part 4, 5 of the resonant circuit 4, 5, 6 having a series resonance character. This second resonant circuit consists mainly of an inductor 13 and a capacitor 14 connected in parallel.

It further includes a resistor 15, via which the parallel resonant circuit 13, 14 is connected across the capacitor 4, and a primary winding 16, arranged on a saturable core 17 of a ferro-magnetic material; this core may be an annular core composed of a ferrite, for instance Ferroxcube. This winding 16 in series with the capacitor 14 is connected across the inductor 13 and constitutes the non-linear element of the second resonant circuit. As shown, the winding 16 is the low impedance primary winding of a non-linear control-transformer including a core 17 and two secondary windings 18 and 19, each of which is coupled with the circuit between the emitter and the control-electrode of one of the rectifiers 1 or 2. The second resonant circuit further includes a reactance, for example a second inductor 20, connected in series with the resistor 15 and the parallel combination consisting of the capacitor 14 in series with the winding 16 and the first inductor 13. In addition, a second resistor 21 is connected in series with the inductor 13, in order to restrict the circulating current passing through the inductor 13 and the capacitor 14 to a value at which these elements are still linear.

The circuit between the emitter and the control-electrode of each of the semi-conductor controlled rectifiers 1 and 2 includes a resistor 24 and 25 respectively, which is connected to the secondary winding 18 and 19 respectively via a diode 22 and 23 respectively, each of the latter being connected in the forward direction with respect to the current flowing to the control-electrode. These diodes protect the rectifiers 1 and 2 against reverse pulses by preventing them from flowing to the rectifiers.

When connecting the converter described above to the supply circuit 3, a current pulse is produced across the resonant circuit 4, 5–6, this is due, for example, to the fact that one of the rectifiers 1 or 2 is shunted by a capacitive network 26, 27. This current pulse also excites oscillations in the parallel resonant circuit 4, 5. A different method for starting the converter described in my prior application Serial No. 101,572, filed April 7, 1961, consists in providing an additional winding on the core 17 and in causing a first current pulse to flow through this winding when switching on or in producing a pulse across one of the resistors 24 or 25 by charging a capacitor. However, regardless of the particular starting method used, after one of the rectifiers 1 or 2 has become conducting, the time during which it remains conducting is determined by the natural frequency of the resonant circuit 4, 5–6, If this frequency exceeds the switching frequency. The current flowing in this circuit passes through the zero value after one half period of the series resonance frequency; the current flowing in the conducting rectifier, for example the rectifier 2, also becomes zero and this rectifier extinguishes (see third line of FIG. 2). On the first line of FIG. 2 one half of the voltage ($V_4$) operative across the capacitor 4 is represented. In operation this voltage is, as a first approximation, substantially sinusoidal and more or less distorted by the load and by the energy supply to the resonant circuit 4, 5–6 via one of the rectifiers 1 or 2, which supply is unharmonic with respect to each half period.

The voltage $V_4$ across the capacitor 4 produces, via the resistor 15 and the inductor 20, a voltage across the parallel combination of the inductor 13 and the capacitor 14. The latter voltage produces a current through the capacitor 14 and the primary winding 16 of the control-transformer having core 17. This current is designated $I_{16}$ and is represented on the fourth line of FIG. 2; it leads with respect to the voltage across the capacitor 4.

Substantially immediately after each zero passage of the current through the capacitor 14 and the winding 16, the core 17 abruptly changes over from one magnetic polarization state to the opposite polarization or saturation state. Owing to this change-over, a current pulse is produced through one of the secondary windings 18 or 19. The circuit of one of those windings is blocked for the said current pulse by the coupling diode 22 or 23 and the current pulse therefore passes via the other diode towards the resistor 24 or 25 and the parallel-connected emitter control-electrode circuit of the rectifier 1 or 2. These are designated ignition pulses $I_{22}$ and $I_{23}$ and are represented on the last line of FIG. 2. They produce the alternate ignition or change into the conductive state of the rectifiers 1 and 2.

The switching frequency of the converter is determined mainly by the values of the reactive and resistive elements 13 to 16, 20 and 21 of the second resonant circuit. The inductance of the winding 16 is negligible.

There is a fixed phase relation between the current $I_{16}$ through the capacitor 14 and the primary winding 16 of the control-transformer 16–19 and the voltage $V_4$ applied across the capacitor 4 for given values of the elements of the control-circuits. This phase relation finally determines the switching frequency. Indeed, if the current $I_{16}$ was stronger leading with respect to the voltage $V_4$, the instant when a next-following control-pulse occurs would be advanced and the switching frequency would tend to increase. An increase in switching frequency, however, corresponds to a decrease in the leading time of the current $I_{16}$. In other words the leading angle diminishes as the switching frequency increases and the switching frequency decreases as the leading angle diminishes. Consequently, at a given switching frequency there is an equilibrium and this equilibrium frequency is determined by the values of the resistive and reactive elements of the second resonant circuit and, in principle, it is independent of the remainder of the arrangement. The switching frequency is therefore substantially independent of both the direct voltage applied to the converter from the supply circuit 3 and the load connected to the terminals of the secondary winding 8.

Owing to the presence of the inductor 6 a higher circulating current is produced, as is well-known, through the parallel circuit 4–5. Also, the inductor 20 together with the circuit 13, 14 constitutes a kind of autotransformer having a tuned secondary winding 13, 14, through which a higher circulating current flows. Therefore the energy for controlling the rectifiers 1 and 2 taken from the circuit 4, 5 via the second resonant circuit 13–16, 20 and 21 is comparatively small, since it is mainly restricted by the inductor 20 and the resistor 15 which, in addition, determines the phase of the current passing through the capacitor 14 and the winding 16 with respect to the voltage across the circuit 4, 5.

On the second line of FIG. 2 the voltage $V_1$ between the main current circuit electrodes of the rectifier 1 is represented by a full line. At the instant $t_0$ the rectifier 2 is conducting (see third line of FIG. 2), so that the voltage across the rectifier 1 increases more strongly than the voltage $\frac{1}{2}V_4$ between its hook collector and the center tap of the winding 5, represented in broken lines on the second line of FIG. 2. At the instant $t_1$ the rectifier 2 extinguishes and the voltage across the rectifier 1 then becomes equal to the supply voltage $V_3 + \frac{1}{2}V_4$. At the instant $t_2$ the rectifier 1 becomes conducting, so that the voltage across this rectifier is substantially equal to zero up to the instant $t_4$, when the rectifier extinguishes. At the instant $t_3$ the voltage $V_4$ passes through the zero value point. Between the instants $t_1$ and $t_2$ and between the instants $t_4$ and $t_5$, the two rectifiers 1 and 2 are non-conducting and the voltage across each rectifier is equal to the supply voltage $V_3$ plus one half of the voltage $V_4$ across the circuit 4, 5, i.e. $\frac{1}{2}V_4+V_3$ and $-\frac{1}{2}V_4+V_3$ respectively, or conversely. Finally, at the instant $t_5$, the rectifier 2 again becomes conducting, so that the voltage across the rectifier 1 leaps abruptly from $-\frac{1}{2}V_4+V_3$ to the value $-V_4$ and then varies more steeply. At the instant $t_6$ this voltage passes through the zero value and then increases with opposite polarity, more strongly than the voltage $\frac{1}{2}V_4$, and the whole process repeats itself.

As is illustrated in FIG. 2, the conductive period $t_2$–$t_4$ and $t_5$–$t_7$ respectively of each rectifier is substantially shorter than one half of a period ($t_2$–$t_5$, $t_5$–$t_8$ respectively) of the switching frequency. Thus an important condition for an undisturbed operation of the converter is fulfilled: the time, for example from $t_4$ to $t_6$, elapsing between the instant when a rectifier, for example the rectifier 1 extinguishes and the instant when a forward voltage is again applied to its main current circuit should be longer than the so-called "restoring time" of this rectifier.

This restoring time may be compared to the deionisation time of a gas-filled tube, for example of a thyratron. This is the time which the free charge carriers stored in the rectifier require for flowing away. This time is determined by the circuit arrangement and by the properties (diffusion and recombination time constants, capacity of the control-electrode) of the rectifier itself. With a known type of rectifier, it cannot be made shorter than 12 μsec., unless the rectifier is under-loaded. During this recovery time the application of a forward voltage to the main current electrode path of the rectifier could produce undesired reignitions of this rectifier.

In order to obtain such a conducting period shorter than one half period of the switching frequency, the series resonance frequency of the first resonant circuit 4, 5–6 should be higher than the switching frequency determined mainly by the control-circuit 13–16, 20, 21. If this series resonance frequency is equal to or lower than the switching frequency, the time required for the free charge carriers to flow away from the rectifier is only equal to the time between $t_5$ and $t_6$, or $t_2$ and $t_3$ respectively. The operating and switching frequency of the converter should therefore be chosen low, so that, with this low switching frequency, the time lag obtained is longer than the recovery time of the rectifiers used.

If, under certain conditions, a substantially constant operating-frequency is not desired, the resistor 15 may take the form of a symmetrical resistor, the value of which decreases with increasing voltage across it, for example, a so-called VDR or voltage-dependent resistor. This results in that the switching frequency decreases with increasing voltage across the supply circuit 3 and/or with increasing load voltage across the secondary winding 8. The values of the various elements can be chosen such that, within given limits of the value of the supply voltage $V_3$, a substantially constant energy supply to the parallel resonant circuit 4, 5 and to the load is ensured, the supply being substantially independent of variations of the said voltage.

While the invention has been described with respect to a specific embodiment, many modifications and variations thereof will be readily apparent to those skilled in the art without departing from the inventive concept, the scope of which is set forth in the appended claims.

What is claimed is:

1. A self-generating converter comprising: at least one semi-conductor controlled rectifier having main current circuit electrodes and a control electrode, a direct current supply source having two terminals, the main current circuit electrodes being connected to the different terminals of said supply source, a first resonant circuit having series resonance characteristics, one of the main current circuit electrodes of the rectifier being connected to a corresponding terminal of said supply source through said first resonant circuit, the capacitive portion of said first resonant circuit being coupled with a load circuit, a subcritically damped second resonant circuit connected across the capacitive portion of said first resonant circuit, said second resonant circuit including at least one resistive component and a non-linear element having opposite polarization states, said non-linear element changing over from one polarization state to the opposite polarization state in response to the passage through zero of the current through or the voltage across one of the reactive elements of the second resonant circuit, said change-over producing a pulse, and means for applying said pulse to said control electrode, the switching frequency of the converter thereby being substantially determined by the values of the reactive and resistive elements of the second resonant circuit.

2. A self-generating converter comprising: at least one semi-conductor controlled rectifier having emitter and collector electrodes and a control electrode, a direct current supply source having two terminals, the emitter and collector electrodes being connected to the different terminals of said supply source, a first resonant circuit having series resonance characteristics, one of the main current circuit electrodes of the rectifier being connected to a corresponding terminal of said supply source through said first resonant circuit, the capacitive portion of said first resonant circuit being coupled with a load circuit, a subcritically damped second resonant circuit connected across the capacitive portion of said first resonant circuit, a non-linear control transformer having a low impedance primary winding and a secondary winding inductively coupled to a saturable core composed of a ferromagnetic material having opposite polarization states, said second resonant circuit including at least one resistive component and said low impedance primary winding, said secondary winding being coupled with the circuit between the emitter and the control electrode of the rectifier, said core changing over from one polarization state to the opposite polarization state in response to the passage through zero of the current through or the voltage across one of the reactive elements of the second resonant circuit, said change-over producing a pulse which is applied via said secondary winding to said control electrode, the switching frequency of the converter thereby being substantially determined by the values of the reactive and resistive elements of the second resonant circuit.

3. A converter as claimed in claim 1, said second resonant circuit including a capacitor and a first inductor connected in parallel with each other, said parallel combination being connected in series with said resistive component.

4. A converter as claimed in claim 2, said second resonant circuit including a capacitor and a first inductor connected in parallel with each other, said parallel combination being connected in series with said resistive component.

5. A converter as claimed in claim 4, wherein said primary winding is connected in series with the capacitor of the second resonant circuit.

6. A self-generating converter comprising: at least one semi-conductor controlled rectifier having main current circuit electrodes and a control electrode, a direct current supply source having two terminals, the main current circuit electrodes being connected to the different terminals of said supply source, a first resonant circuit having series resonance characteristics, one of the main current circuit electrodes of the rectifier being connected to a corresponding terminal of said supply source through said first resonant circuit, the capacitive portion of said first resonant circuit being coupled with a load circuit, a subcritically damped second resonant circuit connected across the capacitive portion of said first resonant circuit, said second resonant circuit including at least one resistive component connected in series with a parallel-connected combination of a capacitor and a first inductor, a non-linear element having opposite polarization states, and a second inductor connected in series with said resistive component and said parallel combination, the current flowing through the second resonant circuit producing a higher circulating current through said first inductor and said capacitor, said non-linear element changing over from one polarization state to the opposite polarization state in response to the passage through zero of the current through or the voltage across one of the reactive elements of the second resonant circuit, said change-over producing a pulse, and means for applying said pulse to said control electrode, the switching frequency of the converter thereby being substantially determined by the values of the reactive and resistive elements of the second resonant circuit.

7. A converter as claimed in claim 6, said second resonant circuit being sufficiently strongly damped to restrict said circulating current to a value at which the first inductor and the capacitor are linear.

8. A self-generating converter comprising: at least one semi-conductor controlled rectifier having emitter and collector electrodes and a control electrode, a direct current supply source having two terminals, the emitter and collector electrodes being connected to the different terminals of said supply source, a first resonant circuit having series resonance characteristics, one of the main current circuit electrodes of the rectifier being connected to a corresponding terminal of said supply source through said first resonant circuit, the capacitive portion of said first resonant circuit being coupled with a load circuit, a subcritically damped second resonant circuit connected across the capacitive portion of said first resonant circuit, a non-linear control transformer having a low impedance primary winding and a secondary winding inductively coupled to a saturable core composed of a ferromagnetic material having opposite polarization states, said second resonant circuit including at least one resistive component connected in series with a parallel-connected combination of a capacitor and a first inductor, and said low impedance primary winding, and a second inductor connected in series with said resistive component and said parallel combination, the current flowing through the second resonant circuit producing a higher circulating current through said first inductor and said capacitor, said secondary winding being coupled with the circuit between the emitter and the control electrode of the rectifier, said core changing over from one polarization state to the opposite polarization state in response to the passage through zero of the current through or the voltage across one of the reactive elements of the second resonant circuit, said change-over producing a pulse which is applied via said secondary winding to said control electrode, the switching frequency of the converter thereby being substantially determined by the values of the reactive and resistive elements of the second resonant circuit.

9. A converter as claimed in claim 8, wherein said primary winding is connected in series with the capacitor of the second resonant circuit.

10. A self-generating converter comprising: at least one semi-conductor controlled rectifier having main current circuit electrodes and a control electrode, a direct current supply source having two terminals, the main current circuit electrodes being connected to the different terminals of said supply source, a first resonant circuit having series resonance characteristics, one of the main current circuit electrodes of the rectifier being connected to a corresponding terminal of said supply source through said first resonant circuit, the capacitive portion of said first resonant circuit being coupled with a load circuit, a subcritically damped second resonant circuit connected across the capacitive portion of said first resonant circuit, said first resonant circuit, said second resonant circuit including at least one symmetrical resistor whose resistance value decreases when the voltage across it decreases, said symmetrical resistor being connected in series with a parallel-connected combination of a capacitor and a first inductor, a non-linear element changing over from one polarization state to the opposite polarization state in response to the passage through zero of the current through or the voltage across one of the reactive elements of the second resonant circuit, said change-over producing a pulse, and means for applying said pulse to said control electrode, the switching frequency of the converter thereby being substantially determined by the values of the reactive and resistive elements of the second resonant circuit, said switching frequency decreasing with increasing voltage across the supply circuit and/or across the load circuit.

11. A self-generating converter comprising: at least one semi-conductor controller rectifier having emitter and collector electrodes and a control electrode, a direct current supply source having two terminals, the emitter and collector electrodes being connected to the different terminals of said supply source, a first resonant circuit having series resonance characteristics, one of the main current circuit electrodes of the rectifier being connected to a corresponding terminal of said supply source through said first resonant circuit, the capacitive portion of said first resonant circuit being coupled with a load circuit, a subcritically damped second resonant circuit connected across the capacitive portion of said first resonant circuit, a non-linear control transformer having a low impedance primary winding and a secondary winding inductively coupled to a saturable core composed of a ferromagnetic material having opposite polarization states, said second resonant circuit including at least one symmetrical resistor whose resistance value decreases when the voltage across it decreases, said symmetrical resistor being connected in series with a parallel-connected combination of a capacitor and a first inductor, and said low impedance primary winding, said secondary winding being coupled with the circuit between the emitter and the control electrode of the rectifier, said core changing over from one polarization state to the opposite polarization state in response to the passage through zero of the current through or the voltage across one of the reactive elements of the second resonant circuit, said change-over producing a pulse which is applied via said secondary winding to said control electrode, the switching frequency of the converter thereby being substantially determined by the values of the reactive and resistive elements of the second resonant circuit, said switching frequency decreasing with increasing voltage across the supply circuit and/or across the load circuit.

12. A converter as claimed in claim 11, wherein said primary winding is connected in series with the capacitor of the second resonant circuit.

No references cited.

MILTON O. HIRSHFIELD, *Primary Examiner.*

LLOYD McCOLLUM, *Examiner.*